(12) United States Patent
He (10) Patent No.: US 11,436,863 B2
(45) Date of Patent: Sep. 6, 2022

(54) METHOD AND APPARATUS FOR OUTPUTTING DATA

(71) Applicant: BEIJING BYTEDANCE NETWORK TECHNOLOGY CO., LTD., Beijing (CN)

(72) Inventor: Qian He, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 120 days.

(21) Appl. No.: 16/967,771

(22) PCT Filed: Nov. 19, 2018

(86) PCT No.: PCT/CN2018/116177
§ 371 (c)(1),
(2) Date: Aug. 6, 2020

(87) PCT Pub. No.: WO2020/024484
PCT Pub. Date: Feb. 6, 2020

(65) Prior Publication Data
US 2021/0042504 A1 Feb. 11, 2021

(30) Foreign Application Priority Data
Aug. 3, 2018 (CN) .......................... 201810875904.7

(51) Int. Cl.
*G06T 7/60* (2017.01)
*G06V 40/16* (2022.01)
(Continued)

(52) U.S. Cl.
CPC ......... *G06V 40/171* (2022.01); *G06K 9/6256* (2013.01); *G06T 7/60* (2013.01);
(Continued)

(58) Field of Classification Search
CPC combination set(s) only.
See application file for complete search history.

(56) References Cited

U.S. PATENT DOCUMENTS

| 2018/0204111 A1* | 7/2018 | Zadeh | G06V 10/25 |
| 2019/0147305 A1* | 5/2019 | Lu | G06V 10/768 |
| | | | 382/157 |

FOREIGN PATENT DOCUMENTS

| CN | 106327801 A | 1/2017 |
| CN | 106919913 * | 7/2017 |

(Continued)

OTHER PUBLICATIONS

International Patent Application No. PCT/CN2018/116177; Int'l Search Report; dated Apr. 28, 2019; 2 pages.

*Primary Examiner* — Quan M Hua
(74) *Attorney, Agent, or Firm* — BakerHostetler (57) ABSTRACT

A method and an apparatus for outputting data are provided. The method includes: obtaining a set of human-face key point data, where the human-face key point data characterizes a position of a key point of a human face in a target human-face image; determining human-eye feature data for characterizing a shape feature of a human eye, based on the set of the human-face key point data; and inputting the human-eye feature data into a human-eye size recognition model obtained by pre-training to obtain a degree value for characterizing a size of the human eye, and outputting the degree value. The human-eye size recognition model characterizes a correspondence between human-eye feature data and a degree value. With the above method, the human-face key point data is effectively utilized to determine the size of the human eye, improving the accuracy of recognizing the size of the human eye.

9 Claims, 5 Drawing Sheets

(51) Int. Cl.
  *G06K 9/62* (2022.01)
  *G06V 40/18* (2022.01)
(52) U.S. Cl.
  CPC .... *G06V 40/18* (2022.01); *G06T 2207/20081* (2013.01); *G06T 2207/30201* (2013.01)

(56) References Cited

FOREIGN PATENT DOCUMENTS

| | | | |
|---|---|---|---|
| CN | 107358151 A | | 11/2017 |
| CN | 108288023 | * | 12/2017 |
| CN | 107862673 A | | 3/2018 |
| CN | 108229301 A | | 6/2018 |
| CN | 108288023 A | | 7/2018 |
| JP | 2016114719 | * | 6/2016 |

* cited by examiner

METHOD AND APPARATUS FOR OUTPUTTING DATA

METHOD AND APPARATUS FOR OUTPUTTING DATA

The present application is the national phase application of International Patent Application No. PCT/CN2018/116177, titled "METHOD AND APPARATUS FOR OUTPUTTING DATA", filed on Nov. 19, 2018, which claims the priority to Chinese Patent Application No. 201810875904.7, titled "METHOD AND APPARATUS FOR OUTPUTTING DATA", filed by the applicant "Beijing Bytedance Network Technology Co., Ltd." on Aug. 3, 2018 with the Chinese Patent Office, both of which are incorporated herein by reference in their entireties.

FIELD

The present disclosure relates to the technical field of computers, and in particular to a method and an apparatus for outputting data.

BACKGROUND

With the development of computer technologies, many image processing applications appears. A captured human-face image can be deformed and toned by using such applications. For example, an eye image can be recognized from a human-face image and the eye image can be magnified by using some image processing applications.

SUMMARY

A method and an apparatus for outputting data are provided according to the embodiments of the present disclosure.

In a first aspect, a method for outputting data is provided according to an embodiment of the present disclosure. The method includes obtaining a set of human-face key point data, where the human-face key point data characterizes a position of a key point of a human face in a target human-face image; determining human-eye feature data for characterizing a shape feature of a human eye, based on the set of the human-face key point data; and inputting the human-eye feature data into a human-eye size recognition model obtained by pre-training to obtain a degree value for characterizing a size of the human eye, and outputting the degree value, where the human-eye size recognition model characterizes a correspondence between human-eye feature data and a degree value.

In some embodiments, the obtaining the set of the human-face key point data includes: obtaining the target human-face image; and inputting the target human-face image into a human-face key point extraction model obtained by pre-training to obtain the set of the human-face key point data, where the human-face key point extraction model characterizes a correspondence between a human-face image and a set of human-face key point data.

In some embodiments, the determining the human-eye feature data for characterizing the shape feature of the human eye, based on the set of the human-face key point data includes: extracting human-face key point data characterizing an area of a human eye from the set of the human-face key point data as human-eye key point data, and determining at least two distance values based on the human-eye key point data, where each of the at least two distance values characterizes a distance between two human-eye key points, the two human-eye key points are respectively indicated by two piece of human-eye key point data; and determining at least one distance ratio as the human-eye feature data based on the at least two distance values.

In some embodiments, after the outputting the degree value, the method further includes: determining a magnification factor for magnifying a human-eye image in the target human-face image based on the degree value, and outputting the magnification factor.

In some embodiments, the human-eye size recognition model is obtained by training through following steps: acquiring a set of training samples, where the training sample includes sample human-eye feature data for characterizing the shape feature of the human eye indicated by the training sample, and a labeling degree value for labeling the sample human-eye feature data and characterizing the size of the human eye indicated by the training sample, and the sample human-eye feature data is predetermined based on the set of the human-face key point data corresponding to the training sample; and obtaining the human eye size recognition model by training by using a machine learning method, the determined sample human-eye feature data being taken as an input, and the labeling degree value corresponding to the inputted sample human-eye feature data being taken as a desired output.

In some embodiments, the labeling degree value included in the training sample characterizes that the size of the human eye indicated by the sample human-eye feature data is large, medium, or small.

In a second aspect, an apparatus for outputting data is provided according to an embodiment of the present disclosure. The device includes an obtaining unit, a first determining unit, and a recognizing unit. The obtaining unit is configured to obtain a set of human-face key point data, where the human-face key point data characterizes a position of a key point of a human face in a target human-face image. The first determining unit is configured to determine human-eye feature data for characterizing a shape feature of a human eye, based on the set of the human-face key point data. The recognizing unit is configured to input the human-eye feature data into a human-eye size recognition model obtained by pre-training to obtain a degree value for characterizing a size of the human eye, and output the degree value, where the human-eye size recognition model characterizes a correspondence between human-eye feature data and a degree value.

In some embodiments, the obtaining unit includes an obtaining module and an extracting module. The obtaining module is configured to obtain the target human-face image. The extracting module is configured to input the target human-face image into a human-face key point extraction model obtained by pre-training to obtain the set of the human-face key point data, where the human-face key point extraction model characterizes a correspondence between a human-face image and a set of human-face key point data.

In some embodiments, the first determining unit includes a first determining module and a second determining module. The first determining module is configured to extract human-face key point data characterizing an area of a human eye from the set of the human-face key point data as human-eye key point data, and determine at least two distance values based on the human-eye key point data, where each of the at least two distance values characterizes a distance between two human-eye key points, the two human-eye key points are respectively indicated by two piece of human-eye key point data. The second determining module is configured to determine at least one distance ratio as the human-eye feature data based on the at least two distance values.

In some embodiments, the apparatus further includes a second determining unit configured to determine a magnification factor for magnifying a human-eye image in the target human-face image based on the degree value, and output the magnification factor.

In some embodiments, the human-eye size recognition model is obtained by training through following steps: acquiring a set of training samples, where the training sample includes sample human-eye feature data for characterizing the shape feature of the human eye indicated by the training sample, and a labeling degree value for labeling the sample human-eye feature data and characterizing the size of the human eye indicated by the training sample, and the sample human-eye feature data is predetermined based on the set of the human-face key point data corresponding to the training sample; and obtaining the human eye size recognition model by training by using a machine learning method, the determined sample human-eye feature data being taken as an input, and the labeling degree value corresponding to the inputted sample human-eye feature data being taken as a desired output.

In some embodiments, the labeling degree value comprised in the training sample characterizes that the size of the human eye indicated by the sample human-eye feature data is large, medium, or small.

In a third aspect, an electronic device is provided according to an embodiment of the present disclosure. The electronic device includes one or more processors and a storage apparatus. The storage apparatus stores one or more programs. When executed by the one or more processors, the one or more programs cause the one or more processors to implement the method according to any one of the above embodiments in the first aspect.

In a fourth aspect, a computer readable medium is provided according to an embodiment of the present disclosure. The computer readable medium stores a computer program configured to implement the method according to any one of the above embodiments in the first aspect when being executed by a processor.

The method and the apparatus for outputting data are provided according to the embodiments of the present disclosure. The set of human-face key point data is obtained, and the human-eye feature data is determined based on the set of the human-face key point data. Then, the human-eye feature data is inputted into the human-eye size recognition model to obtain the degree value for characterizing the size of the human eye. In this way, the human-face key point data is effectively utilized to determine the size of the human eye, thereby improving the accuracy in recognizing the size of the human eye.

BRIEF DESCRIPTION OF THE DRAWINGS

Further features, objects and advantages of the present disclosure will be more apparent by illustrating in detail the non-limiting embodiments with reference to accompanying drawings.

DETAILED DESCRIPTION OF THE EMBODIMENTS

The present disclosure is further described in detail below with reference to the accompanying drawings and embodiments. It should be understood that the specific embodiments described herein are only illustrative of the disclosure, and are not intended to limit the disclosure. It also should be noted that, for the convenience of description, only parts related to the disclosure are shown in the drawings.

It should be noted that the embodiments in the present disclosure and the features in the embodiments may be combined with each other without conflict. Hereinafter, the present disclosure is described in detail below with reference to the accompanying drawings in conjunction with the embodiments.

Figure 1:
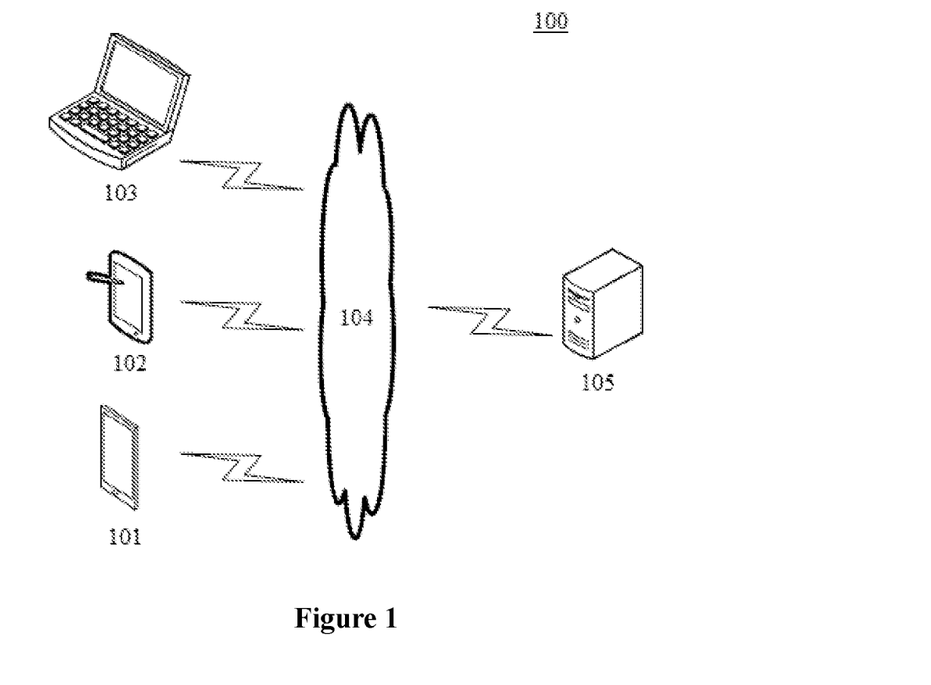
FIG. 1 is a diagram showing an exemplary system architecture to which a method and an apparatus according to an embodiment of the present disclosure may be applied.

FIG. 1 shows a system architecture 100 to which a method for outputting data or an apparatus for outputting data according to an embodiment of the present disclosure may be applied.

As shown in FIG. 1, the system architecture 100 may include a terminal device 101, a terminal device 102, a terminal device 103, a network 104, and a server 105. The network 104 is configured to provide a medium for communication links among the terminal devices 101, 102, 103 and the server 105. The network 104 may include various types of connections, such as wired communication links, wireless communication links, or fiber optic cables.

Users may use the terminal devices 101, 102, and 103 to interact with the server 105 via the network 104, to receive or send messages. Various applications, such as a video playback application, an image processing application, and a social platform application, may be installed on the terminal devices 101, 102, and 103.

The terminal devices 101, 102, and 103 may be implemented by hardware or software. In a case that the terminal devices 101, 102, and 103 are implemented by hardware, the terminal devices 101, 102, and 103 may be various electronic devices having data processing functions, including but not limited to smart phones, tablets, e-book readers, MP3 (Moving Picture Experts Group Audio Layer III) players, MP4 (Moving Picture Experts Group Audio Layer IV) players, laptop portable computers, and desktop computers. In a case that the terminal devices 101, 102, and 103 are implemented by software, the terminal devices 101, 102, and 103 may be installed on the above-exemplified electronic devices, and the terminal devices 101, 102, and 103 may be implemented as multiple applications or software modules (for example, applications or software modules for providing distributed services), or may be implemented as a single application or software module, which is not limited in the present disclosure.

The server 105 may be a server that provides various services, such as a back-end image processing server that provides support for displaying images on the terminal devices 101, 102, and 103. The back-end image processing server may process data such as a received image and output the processing result (for example, a degree value characterizing a size of a human eye).

It should be noted that, the method for outputting data according to the embodiment of the present disclosure may be performed by the server 105 or by the terminal devices 101, 102, and 103, and the apparatus for outputting data may be provided in the server 105 or in the terminal devices 101, 102, and 103.

It should be noted that the server may be implemented by hardware or software. In a case that the server is implemented by hardware, the server may be a single server or a distributed server cluster including multiple servers. In a case that the server is implemented by software, the server may be implemented as multiple applications or software modules (for example, applications or software modules for providing distributed services), or may be implemented as a single application or software module, which is not limited in the present disclosure.

It should be understood that the number of terminal devices, networks, and servers in FIG. 1 is only exemplary. The number of terminal devices, networks, and servers may be arbitrary and may be determined according to implementation requirements. In a case that the set of the human-face key point data is not obtained remotely, the above system architecture may not include the network, and include only the terminal device or the server.

Figure 2:
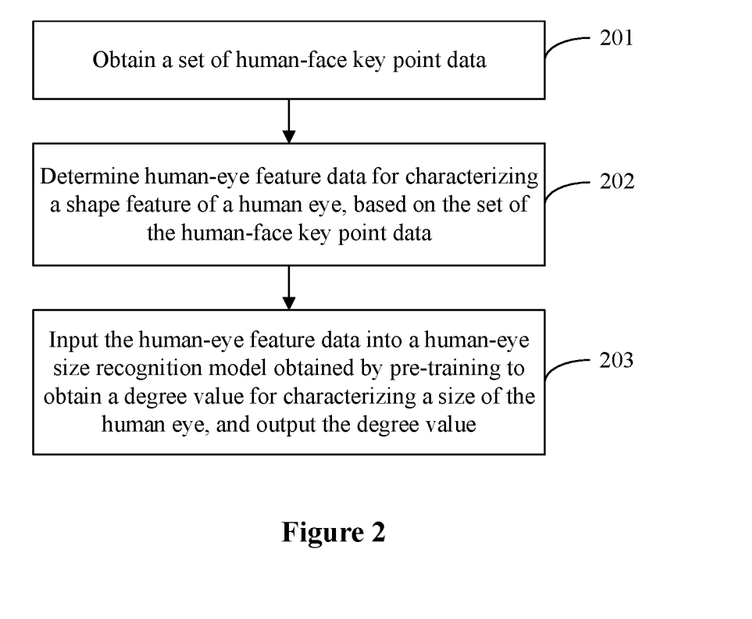
FIG. 2 is a flow chart showing a method for outputting data according to an embodiment of the present disclosure.

Reference is made to FIG. 2, which shows a flow 200 of a method for outputting data according to an embodiment of the present disclosure. The method for outputting data includes the following steps from 201 to 203.

In step 201, a set of human-face key point data is obtained.

In this embodiment, the execution body of the method for outputting data (for example, the server or the terminal device shown in FIG. 1) may obtain the set of the human-face key point data locally or remotely via a wired connection or a wireless connection. The human-face key point data characterizes a position of a key point of a human face in a target human-face image. For example, the human-face key point data may include coordinate values, and the position of the key point of the human face may be determined in the target human-face image based on the coordinate values. The key point of the human face may be a point with apparent semantic discrimination for characterizing a position of a composition part of a human face in a human-face image. For example, the key point of the human face may be a point for characterizing a nose, or a point for characterizing an eye. The target human-face image described above may be a human-face image acquired in advance, on which recognition of the key point of the human face is to be performed. For example, the target human-face image may be an image of a target human face (for example, a face of a user using a terminal device as shown in FIG. 1 or a face of another person) captured by a preset camera.

In some optional implementation manners of this embodiment, the execution body may obtain the set of the human-face key point data according to the following steps.

First, the target human-face image is obtained. Specifically, the execution body may obtain the target human-face image locally or remotely, and the target human-face image may be an image on which recognition of the key point of the human face is to be performed. As an example, the execution body may be in a communication connection with a camera, and the camera may capture a target human-face image of a target human face (for example, a face of a user using the terminal device as shown in FIG. 1 or a face of another person).

It should be noted that the target human-face image may be a single image or an image frame extracted from a target video. For example, the target human-face image may be a currently displayed image frame included in a video played by the execution body.

Next, the target human-face image is inputted into a human-face key point extraction model obtained by pre-training to obtain the set of the human-face key point data. The human-face key point extraction model characterizes a correspondence between a human-face image and a set of human-face key point data. Specifically, the human-face key point extraction model may be obtained by training an initial model (for example, a Convolutional Neural Network (CNN), or an Active Shape Model (ASM)) by using a machine learning method based on a training sample. It should be noted that the method for obtaining the human-face key point extraction model by training is a well-known technology widely studied and applied currently, and is not described herein.

In step 202, human-eye feature data for characterizing a shape feature of a human eye is determined based on the set of the human-face key point data.

Figure 3A:
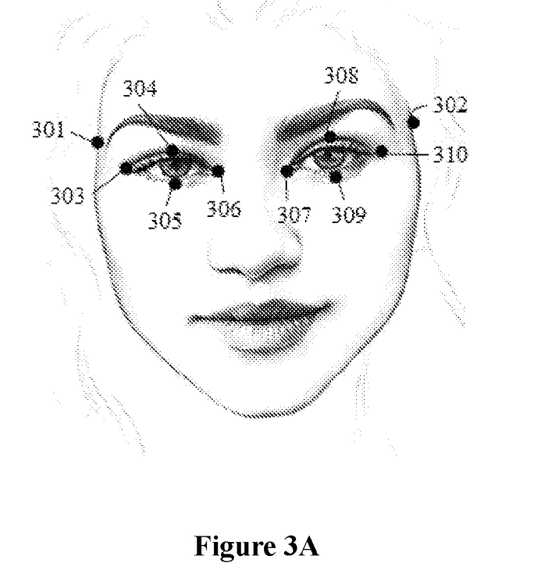
FIG. 3A is a schematic diagram showing exemplary human-eye key points extracted from a human-face key point set by using a method for outputting data according to an embodiment of the present disclosure.
Figure 3B:
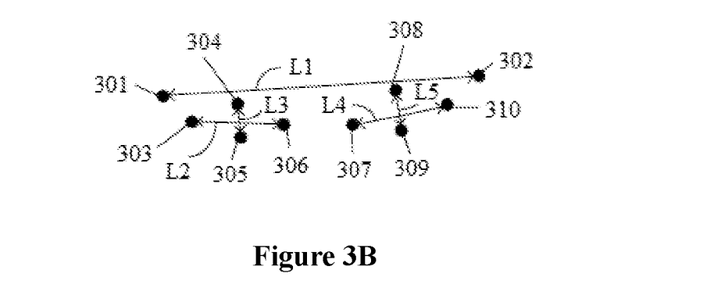
FIG. 3B is a schematic diagram showing an example of at least two distance values in a method for outputting data according to an embodiment of the present disclosure.

In this embodiment, the execution body may determine the human-eye feature data for characterizing the shape feature of the human eye based on the set of the human-face key point data obtained in step 201. Specifically, the execution body may extract a part of the human-face key point data from the set of the human-face key point data, and determine human-eye feature data based on the extracted human-face key point data. The human-eye feature data may be used to characterize the shape feature of the human eye (for example, a length of a single human eye, and a distance between two eyeballs). As an example, each human-face key point data in the set of the human-face key point data may have a corresponding number, and the execution body may extract, according to a number specified by a technician, the human-face key point data characterizing an area of an eye from the set of the human-face key point data as human-eye key point data. The execution body may determine the extracted human-eye key point data as the human-eye feature data. Alternatively, the execution body may calculate, as specified by a technician, at least two distance values as the human-eye feature data based on the extracted human-eye key point data, where each of the at least two distance values characterizes a distance between two human-eye key points indicated by two pieces of human-eye key point data. For example, as shown in FIG. 3A, 301 to 310 represents human-eye key points characterized by the human-eye key point data extracted from the set of the human-face key point data. As shown in FIG. 3B, L1 represents a distance between the human-eye key point 301 and the human-eye key point 302, L2 represents a distance between the human-eye key point 303 and the human-eye key point 306, L3 represents a distance between the human-eye key point 304 and the human-eye key point 305, L4 represents a distance between the human-eye key point 307 and the human-eye key point 310, L5 represents a distance between the human-eye key point 308 and the human-eye key point 309, and the distances L1, L2, L3, L4, and L5 can be used as the human-eye feature data.

In some optional implementations of this embodiment, the execution body may determine the human-eye feature data according to the following steps.

First, the human-face key point data characterizing an area of a human eye is extracted from the set of the human-face key point data as the human-eye key point data, and at least two distance values are determined based on the human-eye key point data, where each of the at least two distance values characterizes a distance between two human-eye key points indicated separately by two pieces of human-eye key point data. Specifically, the execution body may determine at least two distance values based on the human-eye key points specified by a technician. As an example, referring to FIG. 3A and FIG. 3B, the execution body may calculate five distance values, which are L1, L2, L3, L4, and L5. It should be noted that the area of the human eye characterized by the extracted human-eye key point data may include not only the human-eye image, but also other images such as an eyebrow image and a forehead image. The human-face key point located in the area of the human eye may be determined as the human-eye key point. It should be further noted that the human-eye key points 301 to 310 and the distance values L1 to L5 shown in FIG. 3A and FIG. 3B are only exemplary. In practice, the extracted human-eye key points may not be limited to the points 301 to 310 as shown in FIG. 3A, and the distance values may not be limited to the distances L1 to L5 as shown in FIG. 3B.

Next, at least one distance ratio is determined as the human-eye feature data based on the at least two distance values. Specifically, the execution body may perform, as specified by technician, a calculation based on distance values included in the at least two distance values to obtain at least one distance ratio. As an example, referring to FIG. 3B, multiple distance ratios may be calculated based on the distances L1, L2, L3, L4, and L5, including L3/L2, L4/L5, L2/L1, L3/L1, L4/L1, and L5/L1. It should be noted that the distance ratios enumerated in the above example are only exemplary. In practice, the determined distance ratio may not be limited to the distance ratios listed above. Generally, the obtained distance ratios used as the human-eye feature data may have a form of vectors. For example, the human-eye feature data may be vectors (L3/L2, L4/L5, L2/L1, L3/L1, L4/L1, and L5/L1).

In step 203, the human-eye feature data is inputted into a human-eye size recognition model to obtain a degree value for characterizing the size of the human eye, and the degree value is outputted.

In this embodiment, the execution body may input the human-eye feature data into a human-eye size recognition model obtained by pre-training to obtain a degree value for characterizing the size of the human eye, and output the obtained degree value. The degree value may characterize the size of the human eye. As an example, the degree value may be a value greater than or equal to zero and less than or equal to 2, a greater degree value represents a larger human eye, and a smaller degree value represents a smaller human eye. The human-eye size recognition model may be used to characterize a correspondence between the human-eye feature data and the degree value. Generally, the degree value outputted by the human-eye size recognition model may be a probability that the human eye indicated by the human-eye feature data is a large eye. For example, a degree value of 0.8 represents that the probability that the human eye is a large eye is 0.8. Alternatively, the degree value may be a value calculated based on the probability. For example, the degree value may be obtained by multiplying the probability that the human eye is a large eye by 2, that is, if the probability is 0.5, the degree value is 1.

As an example, the human-eye size recognition model may be a correspondence table that is predetermined by a technician based on statistics on a large amount of human-eye feature data and degree values, and that stores multiple correspondences between human-eye feature data and degree values, or the human-eye size recognition model may be a model obtained by performing supervised training on existing classification models (for example, a logistic regression model, or support vector machine (SVM)).

In some optional implementations of this embodiment, the execution body or other electronic device may obtain the human-eye size recognition model according to the following training steps.

First, a set of training samples is acquired. The training sample includes sample human-eye feature data for characterizing the shape feature of the human eye indicated by the training sample, and a labeling degree value for labeling the sample human-eye feature data and characterizing the size of the human eye indicated by the training sample. The sample human-eye feature data may be predetermined based on the set of the human-face key point data corresponding to the training sample. Generally, the set of the human-face key point data corresponding to the training sample may be a set of human-face key point data extracted from a predetermined sample human-face image, and the execution body or another electronic device that obtains the human-eye size recognition model by training may obtain the sample human-eye feature data based on the extracted set of the human-face key point data. It should be noted that the method for obtaining the sample human-eye feature data based on the set of the human-face key point data may be the same as the method described in step 202, and is not described herein again.

Next, the human-eye size recognition model is obtained by training by using a machine learning method, with the determined sample human-eye feature data being taken as an input, and the labeling degree value corresponding to the inputted sample human-eye feature data being taken as a desired output. For example, the labeling degree value may be set by a technician and may characterize the size of the human eye indicated by the sample human-eye feature data. As an example, the labeling degree value may be 0 or 1, where 0 represents that the human eye indicated by the sample human-eye feature data is small, and 1 represents that the human eye indicated by the sample human-eye feature data is large.

In some optional implementations of this embodiment, the labeling degree value included in the training sample characterizes that the size of the human eye indicated by the sample human-eye feature data is large, medium or small. As an example, the labeling degree value may be 0, 1 or 2, where 0 represents that the human eye indicated by the sample human-eye feature data is small, 1 represents that the human eye indicated by the sample human-eye feature data has a medium size, and 2 represents that the human eye indicated by the sample human-eye feature data is large. The human-eye size recognition model obtained by training may output a degree value which is greater than or equal to zero and less than or equal to two. Generally, three probability values may be obtained by using the human-eye size recognition model, the three probability values respectively representing the probabilities that the size of the human eye indicated by the inputted human-eye feature data is large, medium, and small, and the human-eye recognition model may calculate a degree value based on the three probability values. For example, if the obtained three probability values are P0, P1, and P2, which respectively corresponding to the labeling degree values 0, 1, and 2, the outputted degree value may be P0×0+P1×1+P2×2.

Figure 4:
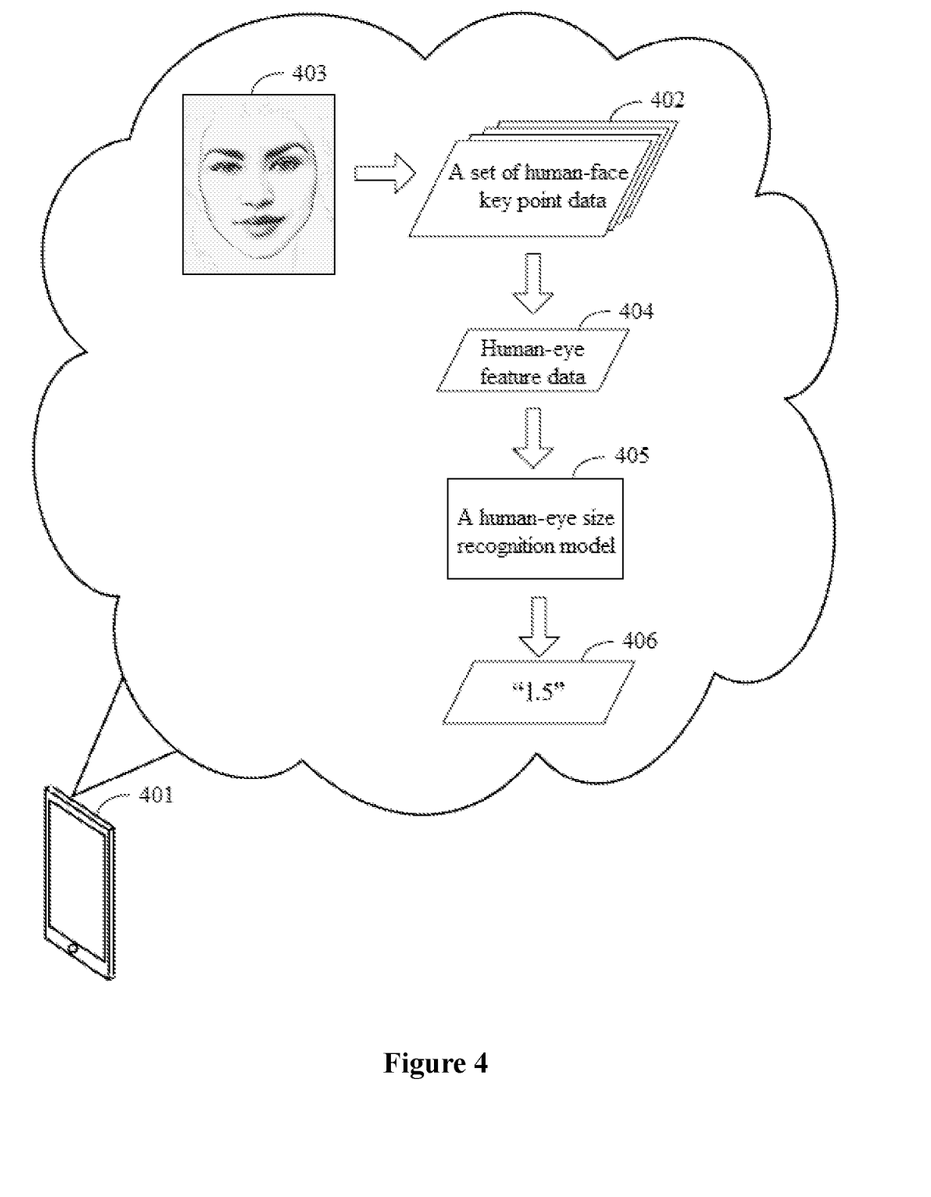
FIG. 4 is a schematic diagram showing an application scenario of a method for outputting data according to an embodiment of the present disclosure.

Reference is made to FIG. 4, which shows a schematic diagram of an application scenario of a method for outputting data according to an embodiment of the present disclosure. In the application scenario of FIG. 4, a terminal device 401 first obtains a set of human-face key point data 402. The human-face key point data is extracted by the terminal device 401 from a target human-face image 403 in advance and characterizes a position of a key point of a human face. The target human-face image 403 is an image of a face of a user who uses the terminal device 401 that is captured by the terminal device 401. Next, the terminal device 401 determines the human-eye feature data 404 for characterizing a shape feature of a human eye based on the set of the human-face key point data 402 (for example, the human-eye key point data characterizing positions of a human eye is extracted from the set of the human-face key point data 402, then distances between positions of human-eye key points indicated by the human-eye key point data are calculated, and then a ratio between the distances is calculated to obtain the human-eye feature data). Finally, the terminal device inputs the human-eye feature data 404 into a human-eye size recognition model 405 obtained by pre-training, to obtain a degree value 406 characterizing the size of the human eye (for example, "1.5") and output the degree value 406.

The method for outputting data according to the embodiments of the present disclosure includes: obtaining the set of human-face key point data, determining the human-eye feature data based on the set of the human-face key point data, and inputting the human-eye feature data into the human-eye size recognition model to obtain the degree value for characterizing the size of the human eye. In this way, the human-face key point data is effectively utilized to determine the size of the human eye, thereby improving the accuracy in recognizing the size of the human eye.

Figure 5:
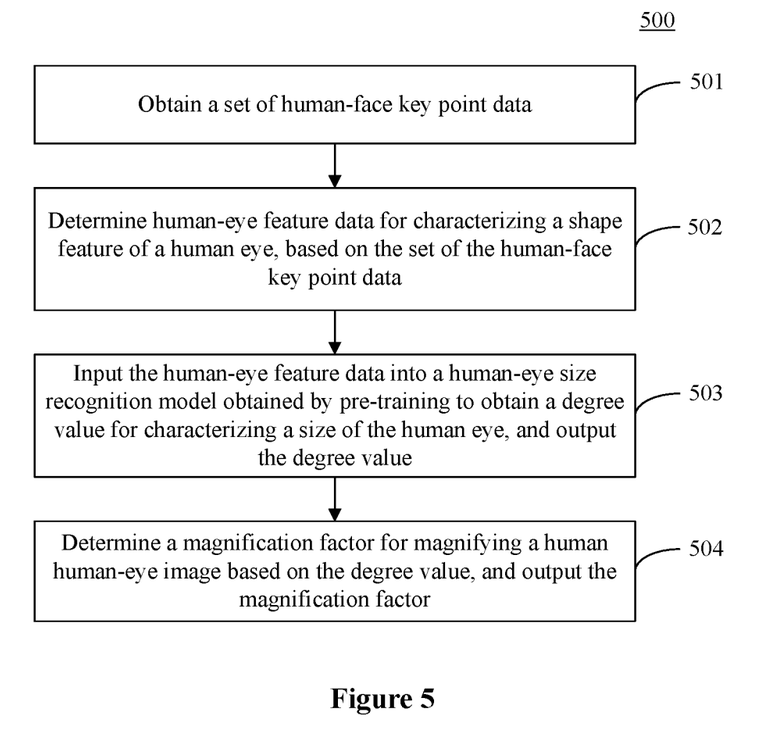
FIG. 5 is a flow chart showing a method for outputting data according to another embodiment of the present disclosure.

Reference is made to FIG. 5, which shows a flow 500 of a method for outputting data according to another embodiment of the present disclosure. The flow 500 of the method for outputting data includes the following steps 501 to 504.

In step 501, a set of human-face key point data is obtained.

In this embodiment, step 501 is substantially the same as step 201 in the embodiment corresponding to FIG. 2, which is not described herein again.

In step 502, human-eye feature data for characterizing a shape feature of a human eye is determined based on the set of the human-face key point data.

In this embodiment, step 502 is substantially the same as step 202 in the embodiment corresponding to FIG. 2, which is not described herein again.

In step 503, the human-eye feature data is inputted into a human-eye size recognition model obtained by pre-training to obtain a degree value for characterizing a size of the human eye, and the degree value is outputted.

In this embodiment, step 503 is substantially the same as step 203 in the embodiment corresponding to FIG. 2, which is not described herein again.

In step 504, a magnification factor for magnifying a human-eye image in the target human-face image is determined based on the degree value, and the magnification factor is outputted.

In this embodiment, an execution body of the method for outputting data (for example, the server or the terminal device shown in FIG. 1) may determine the magnification factor for magnifying the human-eye image in the target human-face image based on the outputted degree value in the step 503, and output the determined magnification factor. Specifically, the execution body may search a predetermined correspondence table characterizing a correspondence between the degree value and the magnification factor to obtain the magnification factor corresponding to the outputted degree value, or the execution body may obtain the magnification factor by calculating based the outputted degree value according to a predetermined calculation equation. Generally, a greater degree value corresponds to a smaller magnification factor. As an example, if a range of the degree value is [0, 2], the corresponding range of the magnification factor is [1.5, 0.5]. That is, if the degree value is 0, the magnification factor is 1.5; if the degree value is 1, the magnification factor is 1; and if the degree value is 2, the magnification factor is 0.5. The execution body may output the magnification factor in various manners. For example, the execution body may display the magnification factor on a display device connected to the execution body, or the execution body may transmit the magnification factor to another electronic device in a communication connection with the execution body.

Optionally, the execution body or another electronic device may magnify the human-eye image in the target human-face image based on the outputted magnification factor and by using an existing algorithm for amplifying a human-eye image. In the above example, if the degree value is 1, which represents that the human eye is medium, the corresponding magnification factor is 1, and the execution body may magnify the human-eye image in the target human-face image at a preset normal magnification ratio; if the degree value is 0, which represents that the human eye is small, the corresponding magnification factor is 1.5, and the execution body may magnify the human-eye image at 1.5 times the preset normal magnification ratio; and if the degree value is 2, which represents that the human eye is large, the corresponding magnification factor is 0.5, and the execution body or another electronic device may magnify the human-eye image at 0.5 times the preset normal magnification ratio. Therefore, the human-eye image may be magnified at different magnification ratios based on different sizes of human eyes.

As can be seen from FIG. 5, compared with the embodiment in FIG. 2, the flow 500 of the method for outputting data in this embodiment highlights the step of determining the magnification factor for magnifying the human-eye image in the target human-face image based on the outputted degree value, so that different human-eye magnification factors may be obtained based on different sizes of human eyes, facilitating magnification of human-eye images at different magnification ratios based on different sizes of human eyes.

Figure 6:
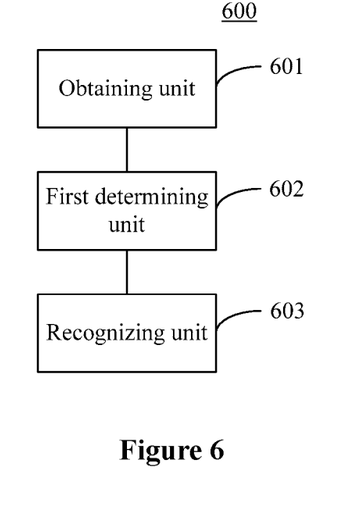
FIG. 6 is a schematic structural diagram showing an apparatus for outputting data according to an embodiment of the present disclosure.

Referring to FIG. 6, an apparatus for outputting data, which is configured to implement the method shown in the above embodiments, according to an embodiment of the present disclosure is shown. The embodiment of an apparatus corresponds to the embodiment of the method shown in FIG. 6, and the apparatus can be applied to various electronic devices.

As shown in FIG. 6, an apparatus 600 for outputting data according to this embodiment includes: an obtaining unit 601, a first determining unit 602, and a recognizing unit 603. The obtaining unit 601 is configured to obtain a set of human-face key point data, where the human-face key point data characterizes a position of a key point of a human face in a target human-face image. The first determining unit 602 is configured to determine human-eye feature data for characterizing a shape feature of a human eye based on the set of the human-face key point data. The recognizing unit 603 is configured to input the human-eye feature data into a human-eye size recognition model obtained by pre-training to obtain a degree value for characterizing a size of the human eye, and output the degree value, where the human-eye size recognition model characterizes a correspondence between the human-eye feature data and the degree value.

In this embodiment, the obtaining unit 601 may obtain the set of the human-face key point data locally or remotely via a wired connection or a wireless connection. The human-face key point data characterizes a position of a key point of a human face in a target human-face image. For example, the human-face key point data may include coordinate values, and the position of the key point of the human face may be determined in the target human-face image based on the coordinate values. The key point of the human face may be a point with apparent semantic discrimination for characterizing a position of a composition part of a human face in a human-face image. For example, the key point of the human face may be a point for characterizing a nose, or a point for characterizing an eye. The target human-face image described above may be a human-ace image acquired in advance, on which recognition of the key point of the human face is to be performed. For example, the target human-face image may be an image of a target human face (for example, a face of a user using a terminal device as shown in FIG. 1 or a face of another person) captured by a preset camera.

In this embodiment, the first determining unit 602 may determine the human-eye feature data for characterizing the shape feature of the human eye based on the set of the human-face key point data obtained by the obtaining unit 601. Specifically, the first determining unit 602 may extract the human-face key point data characterizing a position of the human eye from the set of the human-face key point data as human-eye key point data. As an example, each human-face key point data in a set of human-face key point data may have a corresponding number, and the first determining unit 602 may extract, according to a number specified by a technician, the human-face key point data from the set of the human-face key point data as the human-eye key point data. The human-eye feature data may be used to characterize the shape feature of the human eye (for example, a length of a single human eye, and a distance between two eyeballs). The first determining unit 602 may determine the human-eye feature data in various manners. For example, the first determining unit 602 may determine the extracted human-eye key point data as the human-eye feature data; or the first determining unit 602 may calculate, as specified by a technician, at least two distance values as the human-eye feature data based on the extracted human-eye key point data, where each of the at least two distance values characterizes a distance between two human-eye key points indicated by two pieces of human-eye key point data.

In this embodiment, the recognizing unit 603 may input the human-eye feature data into a human-eye size recognition model obtained by pre-training to obtain a degree value for characterizing the size of the human eye, and output the obtained degree value. The degree value may characterize the size of the human eye. As an example, the degree value may be a value greater than or equal to zero and less than or equal to 2, a greater degree value represents a larger human eye, and a smaller degree value represents a smaller human eye. The human-eye size recognition model may be used to characterize a correspondence between the human-eye feature data and the degree value. Generally, the degree value outputted by the human-eye size recognition model may be a probability that the human eye indicated by the human-eye feature data is a large eye. For example, a degree value of 0.8 represents that the probability that the human eye is a large eye is 0.8. Alternatively, the degree value may be a value calculated based on the probability. For example, the degree value may be obtained by multiplying the probability that the human eye is a large eye by 2, that is, if the probability is 0.5, the degree value is 1.

As an example, the human-eye size recognition model may be a correspondence table that is predetermined by a technician based on statistics on a large amount of human-eye feature data and degree values, and that stores multiple correspondences between human-eye feature data and degree values, or the human-eye size recognition model may be a model obtained by performing supervised training on existing classification models (for example, a logistic regression model, or support vector machine (SVM)).

In some optional implementations of this embodiment, the obtaining unit may include: an obtaining module (not shown in the Figures) and an extracting module (not shown in the Figures). The obtaining module is configured to obtain the target human-face image. The extracting module is configured to input the target human-face image into a human-face key point extraction model obtained by pre-training to obtain the set of the human-face key point data, where the human-face key point extraction model characterizes a correspondence between the human-face image and the set of the human-face key point data.

In some optional implementations of this embodiment, the first determining unit may include: a first determining module (not shown in the Figures) and a second determining module (not shown in the Figures). The first determining module is configured to extract human-face key point data characterizing an area of a human eye from the set of the human-face key point data as human-eye key point data, and determine at least two distance values based on the human-eye key point data, where each of the at least two distance values characterizes a distance between two human-eye key points, the two human-eye key points are respectively indicated by two piece of human-eye key point data. The second determining module is configured to determine at least one distance ratio as the human-eye feature data based on the at least two distance values.

In some optional implementations of the present embodiment, the apparatus 600 may further include: a second determining unit (not shown in the Figures). The second determining unit is configured to determine a magnification factor for magnifying a human-eye image in the target human-face image based on the degree value, and outputting the magnification factor.

In some optional implementations of this embodiment, the human eye size recognition model is obtained by training in the following steps: acquiring a set of training samples, where the training sample includes sample human-eye feature data for characterizing the shape feature of the human eye indicated by the training sample, and a labeling degree value for labeling the sample human-eye feature data and characterizing the size of the human eye indicated by the training sample, and the sample human-eye feature data is predetermined based on the set of the human-face key point data corresponding to the training sample; and obtaining the human-eye size recognition model by training by using a machine learning method, the determined sample human-eye feature data being taken as an input, and the labeling degree value corresponding to the inputted sample human-eye feature data being taken as a desired output.

In some optional implementations of this embodiment, the labeling degree value included in the training sample may characterizes that the size of the human eye indicated by the sample human-eye feature data is large, medium, or small.

The apparatus for outputting data are provided according to the embodiments of the present disclosure. The set of human-face key point data is obtained, and the human-eye feature data is determined based on the set of the human-face key point data. Then, the human-eye feature data is inputted into the human-eye size recognition model to obtain the degree value for characterizing the size of the human eye. In this way, the human-face key point data is effectively utilized to determine the size of the human eye, thereby improving the accuracy in recognizing the size of the human eye.

Figure 7:
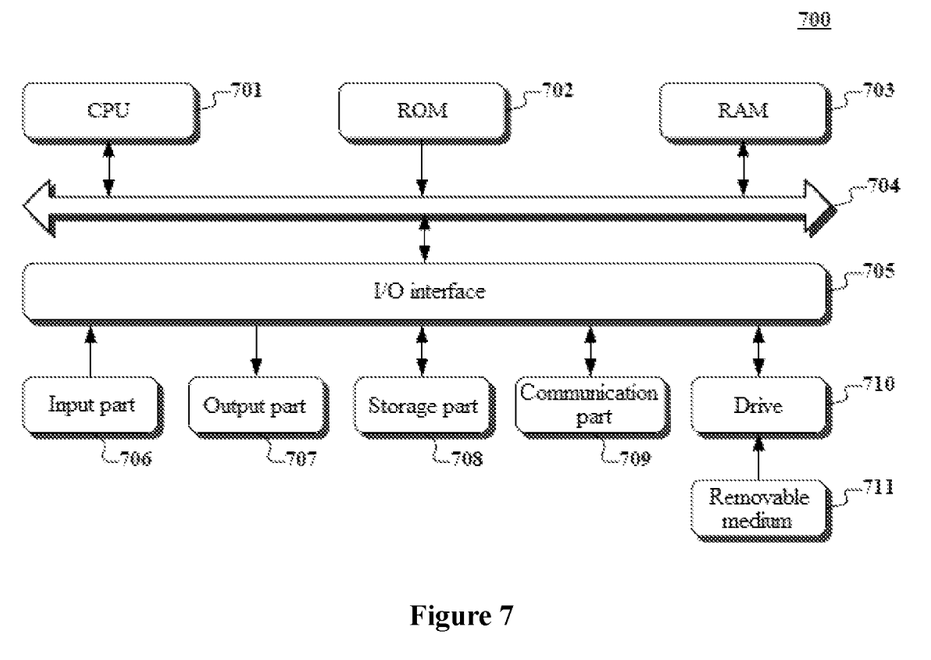
FIG. 7 is a schematic structural diagram showing a computer system for implementing an electronic device according to an embodiment of the present disclosure.

Reference is made to FIG. 7, which shows a schematic structural diagram of a computer system 700 of an electronic device (for example, the server or the terminal device shown in FIG. 1) for implementing the embodiments of the present disclosure. The electronic device shown in FIG. 7 is only an example, and should not limit the function and scope of use of the embodiments of the present disclosure.

As shown in FIG. 7, the computer system 700 includes a central processing unit (CPU) 701, and the CPU 701 can perform various appropriate actions and processes based on a program stored in a read-only memory (ROM) 702 or a program loaded in a random-access memory (RAM) 703 from a storage part 708. The RAM 703 also stores various programs and data required by the system 700 for operation. The CPU 701, the ROM 702, and the RAM 703 are connected to each other via a bus 704. An input/output (I/O) interface 705 is also connected to the bus 704.

The components connected to the I/O interface 705 include: input parts 706 of a keyboard and a mouse, output parts 707 of a liquid crystal display (LCD) and a speaker, a storage part 708 of a hard disk, and a communication part 709 of a network interface card such as a local area network (LAN) card or a modem. A communication part 709 performs a communication processing via a network such as the Internet. A driver 710 is connected to the I/O interface 705 as required. A removable medium 711, such as a magnetic disk, an optical disk, a magneto-optical disk, and a semiconductor memory, is mounted on the drive 710 as required, so that a computer program read from the removable medium 711 is stored in the storage part 708 as required.

In particular, the processes, described above with reference to flow charts, may be implemented as a computer software program according to an embodiment of the present disclosure. For example, a computer program product is provided according to an embodiment of the present disclosure, the computer program product includes a computer program embodied on a computer readable medium, and the computer program includes program codes for executing a method illustrated in a flow chart. In the embodiment, the computer program can be downloaded from a network via the communication part 709, and be installed, and/or the computer program can be read from the removable media 711, and be installed. If the computer program is executed by the central processing unit (CPU) 701, the above-described functions defined in the method of the present disclosure are implemented.

It should be noted that the computer readable medium provided according to the present disclosure, may be a computer readable signal medium or a computer readable medium or any combination of the two. The computer readable medium can be, for example, but not limited to, an electronic, magnetic, optical, electromagnetic, infrared, or semiconductor system, apparatus, or device, or any combination of the foregoing. More particularly, the computer readable medium may include, but not limited to, an electrical connection having one or more wires, a portable computer diskette, a hard disk, a random-access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In the present disclosure, the computer readable medium can be any tangible medium containing or storing a program, where the program can be used by an instruction execution system, apparatus or device or used in combination therewith. In the present disclosure, the computer readable signal medium may include a data signal with computer readable program code embodied therein, for example, in baseband or as part of a carrier wave. The propagated data signal can be in variety forms, including but not limited to, electromagnetic signals, optical signals, or any suitable combination of the foregoing. The computer readable signal medium may be any computer readable medium other than a computer readable medium, and the computer readable medium can transmit, propagate, or transport a program used by an instruction execution system, apparatus or device or used in combination therewith. The program code embodied in the computer readable medium may be transmitted using any appropriate medium, including but not limited to wireless, wired, optical fiber cable, radio frequency (RF), or any suitable combination of the foregoing.

Computer program code for performing operations of the present disclosure may be written in one or more programming languages, or a combination of the foregoing, and the programming language includes object oriented programming languages, such as Java, Smalltalk, and C++, also includes conventional procedural programming languages, such as "C" language or similar programming languages. The program code may be executed entirely on a user's computer, or be executed partly on the user's computer, or be executed as a stand-alone software package, or be executed partly on the user's computer and partly on a remote computer, or be executed entirely on the remote computer or server. In the case that the execution of the program code involves a remote computer, the remote computer can be connected to a user's computer via any kind of network, including a local area network (LAN) or a wide area network (WAN), or can be connected to an external computer (for example, via an Internet providing by an Internet service provider).

The flow charts and schematic diagrams in the Figures shows the architecture, functionality and operation of possible implementations of the products of system, method and computer program provided according to the embodiments of the present disclosure. Each block in the flow charts or schematic diagrams can represent a module, a program segment, or a part of code, and the module, the program segment, or the part of code includes one or more executable instructions for implementing specified logical functions. It should be noted that in some alternative implementations, the functions noted in the blocks may be implemented in a different order than those illustrated in the Figures. For example, two blocks shown in succession may in fact be executed substantially in parallel, and they may sometimes be executed in a reverse order, depending upon the functionality involved. It also should be noted that each block in the schematic diagrams and/or flow charts, and combinations of blocks in the schematic diagrams and/or flowcharts, can be implemented by a dedicated hardware-based system which is configured to implement specified functions or operations, or can be implemented by using a combination of dedicated hardware and computer instructions.

Units involved in the embodiments of the present disclosure may be implemented by software or by hardware. The units may be provided in a processor, for example, described as a processor including an obtaining unit, a first determining unit, and a recognizing unit. The names of the units do not in any way constitute a limitation on the unit itself, for example, the obtaining unit may also be named "a unit for obtaining a set of human-face key point data".

In another aspect, a computer readable medium is further provided according to the present disclosure. The computer readable medium may be included in an electronic device described in the above embodiments, or may be separate and not in the electronic device. The computer readable medium stores one or more programs, and if the one or more programs are executed by the electronic device, the following operations are performed: obtaining a set of human-face key point data, where the human-face key point data characterizes a position of a key point of a human face in a target human-face image; determining human-eye feature data for characterizing a shape feature of a human eye, based on the set of the human-face key point data; and inputting the human-eye feature data into a human-eye size recognition model obtained by pre-training to obtain a degree value for characterizing a size of the human eye, and outputting the degree value, where the human-eye size recognition model characterizes a correspondence between human-eye feature data and a degree value.

The above are only preferred embodiments of the present disclosure and are illustrative of the technical principles applied in the present disclosure. It should be understood by those skilled in the art that the scope of the present disclosure is not limited to the above technical solutions formed by a specific combination of technical features, and also encompasses other technical solutions formed by any combination of the above technical features or equivalent features thereof, without departing from the inventive concept of the present disclosure, for example, technical solutions formed by replacing the above features and the technical features disclosed in present disclosure (but not limited to) with similar functions.

The invention claimed is:

1. A method for outputting data, comprising:
    obtaining a set of human-face key point data, wherein the human-face key point data characterizes a position of a key point of a human face in a target human-face image;
    determining human-eye feature data for characterizing a shape feature of a human eye, based on the set of the human-face key point data; and
    inputting the human-eye feature data into a human-eye size recognition model obtained by pre-training to obtain a degree value for characterizing a size of the human eye, and outputting the degree value, wherein the human-eye size recognition model characterizes a correspondence between human-eye feature data and a degree value,
    wherein the human-eye size recognition model is obtained through:
    acquiring a set of training samples, wherein each training sample among the set of training samples comprises sample human-eye feature data characterizing a shape feature of a sample human-eye, and a labeled degree value characterizing a size of the sample human-eye corresponding to the sample human-eye feature data, and wherein the sample human-eye feature data is predetermined based on a set of human-face key point data corresponding to the training sample, and
    obtaining the human-eye size recognition model using a machine learning method and training the human-eye size recognition model by using sample human-eye feature data of the set of training samples as input and using labeled degree values characterizing sizes of corresponding sample human-eyes as desired output.

2. The method according to claim 1, wherein the obtaining the set of the human-face key point data comprises:
    obtaining the target human-face image; and
    inputting the target human-face image into a human-face key point extraction model obtained by pre-training to obtain the set of the human-face key point data, wherein the human-face key point extraction model characterizes a correspondence between a human-face image and a set of human-face key point data.

3. The method according to claim 1, wherein the determining the human-eye feature data for characterizing the shape feature of the human eye, based on the set of the human-face key point data comprises:
    extracting human-face key point data characterizing an area of a human eye from the set of the human-face key point data as human-eye key point data, and determining at least two distance values based on the human-eye key point data, wherein each of the at least two distance values characterizes a distance between two human-eye key points, the two human-eye key points are respectively indicated by two piece of human-eye key point data; and
    determining at least one distance ratio as the human-eye feature data based on the at least two distance values.

4. The method according to claim 1, wherein after the outputting the degree value, the method further comprises:
    determining a magnification factor for magnifying a human-eye image in the target human-face image based on the degree value, and outputting the magnification factor.

5. An apparatus for outputting data, comprising:
    at least one processor; and
    at least one memory communicatively coupled to the at least one processor and storing instructions that upon execution by the at least one processor cause the device to:
    obtain a set of human-face key point data, wherein the human-face key point data characterizes a position of a key point of a human face in a target human-face image;
    determine human-eye feature data for characterizing a shape feature of a human eye, based on the set of the human-face key point data; and
    input the human-eye feature data into a human-eye size recognition model obtained by pre-training to obtain a degree value for characterizing a size of the human eye, and output the degree value, wherein the human-eye size recognition model characterizes a correspondence between human-eye feature data and a degree value, wherein the human-eye size recognition model is obtained through:
  acquiring a set of training samples, wherein each training sample among the set of training samples comprises sample human-eye feature data characterizing a shape feature of a sample human-eye, and a labeled degree value characterizing a size of the sample human-eye corresponding to the sample human-eye feature data, and wherein the sample human-eye feature data is predetermined based on a set of human-face key point data corresponding to the training sample, and
  obtaining the human-eye size recognition model using a machine learning method and training the human-eye size recognition model by using sample human-eye feature data of the set of training samples as input and using labeled degree values characterizing sizes of corresponding sample human-eyes as desired output.

6. The apparatus according to claim 5, wherein the at least one memory further stores instructions that upon execution by the at least one processor cause the apparatus to:
  obtain the target human-face image; and
  input the target human-face image into a human-face key point extraction model obtained by pre-training to obtain the set of the human-face key point data, wherein the human-face key point extraction model characterizes a correspondence between a human-face image and a set of human-face key point data.

7. The apparatus according to claim 5, wherein at least one memory further stores instructions that upon execution by the at least one processor cause the apparatus to:
  extract human-face key point data characterizing an area of a human eye from the set of the human-face key point data as human-eye key point data, and determine at least two distance values based on the human-eye key point data, wherein each of the at least two distance values characterizes a distance between two human-eye key points, the two human-eye key points are respectively indicated by two piece of human-eye key point data; and
  determine at least one distance ratio as the human-eye feature data based on the at least two distance values.

8. The apparatus according to claim 5, wherein at least one memory further stores instructions that upon execution by the at least one processor cause the apparatus to:
  determine a magnification factor for magnifying a human-eye image in the target human-face image based on the degree value, and output the magnification factor.

9. A non-transitory computer readable medium, storing a computer program, wherein the computer program, when executed by a processor, causes the processor to perform operations, the operations comprising:
  obtaining a set of human-face key point data, wherein the human-face key point data characterizes a position of a key point of a human face in a target human-face image;
  determining human-eye feature data for characterizing a shape feature of a human eye, based on the set of the human-face key point data; and
  inputting the human-eye feature data into a human-eye size recognition model obtained by pre-training to obtain a degree value for characterizing a size of the human eye, and outputting the degree value, wherein the human-eye size recognition model characterizes a correspondence between human-eye feature data and a degree value,
wherein the human-eye size recognition model is obtained through:
  acquiring a set of training samples, wherein each training sample among the set of training samples comprises sample human-eye feature data characterizing a shape feature of a sample human-eye, and a labeled degree value characterizing a size of the sample human-eye corresponding to the sample human-eye feature data, and wherein the sample human-eye feature data is predetermined based on a set of human-face key point data corresponding to the training sample, and
  obtaining the human-eye size recognition model using a machine learning method and training the human-eye size recognition model by using sample human-eye feature data of the set of training samples as input and using labeled degree values characterizing sizes of corresponding sample human-eyes as desired output.

* * * * *